No Printed Specification Available

9811X

Rickets & Mendell,
Pottery Mold.
Patented June 30, 1836.

AM. PHOTO-LITHO. CO. N.Y. (OSBORNE'S PROCESS)

June 30. 1836

Joseph Claghorn Mendell & R. B. Ricketts 9811X

Letters Patent

The schedule referred to in these Letters Patent, and making part of the same, containing a description in the words of the said Joseph Claghorn Mendell and R. B. Ricketts themselves of their improvement in the machine for moulding clay into pipes, Pots, Jars, Jugs, cups and other kinds of Pottery –

---

Figure 1:
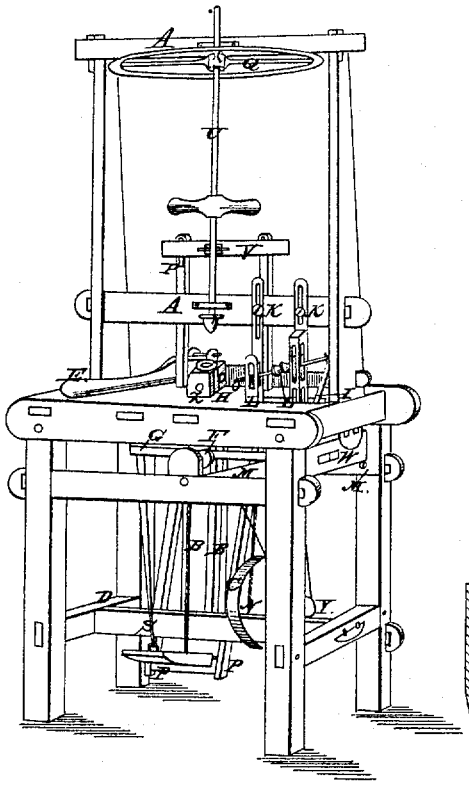

To all to whom these Presents shall come:

Be it known, that We Joseph Claghorn Mendell and Ruben Baren Ricketts in the county of Mason and state of Kentucky have invented a new and useful machine for moulding of clay into Pipes, Pots, Jars, Jugs cups and other kinds of Pottery, and that the following is a full and exact description thereof. The Model is made to a scale of one inch to a foot or may be varied in a vertical inverted, horizontal or other mode, and worked by physical or other force. Fig. 1 in the drawing represents the machine supported by the frame with the acting and reacting powers – A. A are slider boxes supporting and guiding spindle U; on spindle U. is a fly wheel Q which gives motion and power to spindle U and on the lower end is a punch R. screwed on to the spindle U with a steel collar or ring, which cuts off the surplus clay by being pressed on the top of the moulds K, W is the handle started by a wheel of the hand and revolves spindle U fly wheel Q and punch R – On spindle U is two collars or rings for a forked iron to ply between, to hold up and to press down spindle U – V. is keyed or fixed on the top of S.S. from which extends said forked iron P.P. above pass down through the frame and are connected to P.P. below the joints, and P.P. is fastened to lever treadle T. at the bottom by rolling joints, lever treadle T. is fastened at the rear end by a joint to the frame and from the front part of the treadle Lever T. extends a cord or strap up and on to Pulley S. which is on a reacting roller shaft with two other pullies on the same shaft from
the rear pulley winds a cord or strap down and fastened to spring D. -
winding reversely to the one on pulley F. the cord or strap is wound
on to the pulley F. by the spring D. and from the rear pulley by the same
spring D. lifting up lever treadle T. - The third cord or strap extends
from the middle pulley on said reacting roller shaft, down and under
pulley Y. up and on to a double pulley on spindle I. and from said
double pulley extends the fourth cord or strap down and made fast
to spring C. reversely to the third cord or strap on said double pulley
on spindle I - the lower or left end of spindle I punches the hole for
the pipe stem on which there is a steel collar or ring to cut off the surplus
clay at the other end of spindle I is a groove for a forked lever I to play
in which holds spindle I while in its action and reaction, forked
lever I is framed into reacting roller W. which is supported by two
moveable brackets and screws M. M. - G is a lever framed
into reacting roller W. - I and G are fastened into roller W. with
keys so as to be moveable - S is fastened to lever G at the top by
a screw forming a joint and at the lower end to P. on the left by
a pin forming a joint, - K. K are two screws supporting P.P. in
which are two keys and boxes for guiding and supporting spindle
I. - B. B. are the clamps on which the moulds H are fastened with
screws Z. Z. the rear clamp B. is fastened with a hinge to the frame
at the lower end and opened with a spring on the left side - The front
clamp B. is fastened at the top and bottom to the frame lever O
is fastened to the frame on the right and on the left to lever E. -
forming joints at both ends - Lever E is fastened by a joint to the frame
in the rear - The moulds H are closed and wedged together by press-
ing down lever E which wedges Lever O between a cleat and the
rear clamp B. and by lifting up lever E. the moulds are open-
ed by the spring above mentioned - For moulding pots, jars, jugs
cups and other kinds of pottery, the spindle I. is not wanted, and may
be taken off by taking out a pin where I is connected to P. and the
cord or strap off of the middle pulley, the moulds H may be taken off and the punch R. by unscrewing them, and others put on if required. Weights may be substituted for the springs —

Figure 2:
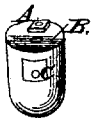
Figure 3:
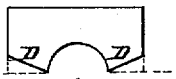
Figure 4:
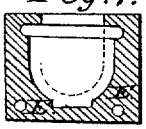
Figure 5:
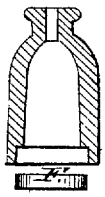
Figure 6:
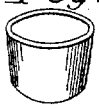
Figure 7:
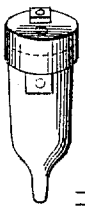
Figure 8:
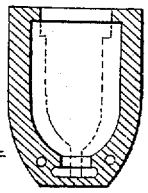

Fig. 2. 3 & 4. In the drawing represents the small model which shows the moulds and punch for moulding pots, cups and other kinds of open mouth pottery. Fig. 2 is a punch for fig. 4: this punch has a projecting square and screw hole on the top marked A. for screwing on and off of the spindle. B is a vent hole which may be lesser or greater if required for discharging the surplus clay at the hole B. on the top — Fig. 3 is a topview of one half of the mould, the dotted lines DD shows the outer edges sloped or bevelled off leaving the inner edges to close on each other and readily freeing the surplus clay, should any fall between them when closing, also requiring but little or no trimming. Fig. 4 is the inside view of the one half of the moulds. E.E. are the stay pins or holes, the tops of these moulds project inward the thickness of the pot, cup or other vessel, preventing the moulding from being drawn out of the moulds with the punch — Fig. 5. 6. 7 & 8. Represents a jug moulded, and the bottom cutter punch and moulds — Fig. 5. represents a jug moulded ready for receiving the bottom F. which is to be pressed into the shoulder (see dotted line) when in order for finishing — Fig. 6 represents a cutter in shape of a Taylor's thimble for cutting the bottoms (see F. fig. 5) the clay is rolled to a proper thickness with a rolling pin commonly used by Potters — Fig. 7. Represents the punch the head of which sinks into the moulds below the inward projection of the top which projection is about half the thickness of the jug and forms a shoulder for the bottom (see dotted lines in Fig. 5 & 8. also vent holes C. & B. screw hole and square A in fig 2 — Fig. 8 represents the one half of a mould differing in shape & inward projection of the top from fig. 3 & 4; which projection is about equal to one half the thickness of the sides of the jug — What we claim as our own invention and not previously known is the projection of the machine frame with the acting and reacting powers, produced by levers, treadle, pullies, wedge wheel roller

9811X shafts, cords or straps, springs or weights, also the moulds and appa-
ratus represented in the figures 2. 3. & 4. also 5. 6. 7. & 8 and in the above
specification and drawings. We also claim the improvement of the
pipe moulds by attaching steel collars or rings on the top and
side, and by sloping or bevelling off the outer edges, leaving the
inner edges to close on each other, [illegible] which frees the surplus clay
that falls between them, when closing and requires but little or
no trimming to the Pipes Joseph C. Mendell
R. B. Ricketts Witnesses
Matthew Markland
Chas. Humphreys

[illegible]

Drawing (1339 words)